United States Patent
Lyon et al.

(10) Patent No.: US 9,043,241 B1
(45) Date of Patent: May 26, 2015

(54) ENCRYPTING A TEXT UNIT FROM PACKAGE INFORMATION FOR PACKAGE AUTHENTICATION

(75) Inventors: Geoff Lyon, Menlo Park, CA (US); Salil Pradhan, San Jose, CA (US); Vinay Deolalikar, Mountain View, CA (US); Alipio Caban, Arecibo, PR (US); Lester Ortiz, Camuy, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2982 days.

(21) Appl. No.: 11/081,455

(22) Filed: Mar. 16, 2005

(51) Int. Cl.
*G06Q 99/00* (2006.01)
*G06Q 50/28* (2012.01)

(52) U.S. Cl.
CPC ............ *G06Q 50/28* (2013.01); *G06Q 2220/10* (2013.01)

(58) Field of Classification Search
CPC ........................... G06Q 50/28; G06Q 2220/10
USPC ................................. 705/50, 60, 62
See application file for complete search history.

(56) References Cited

U.S. PATENT DOCUMENTS

| | | | | |
|---|---|---|---|---|
| 3,553,437 A | * | 1/1971 | Boothroyd | 235/471 |
| 5,953,426 A | * | 9/1999 | Windel et al. | 380/51 |
| 6,069,955 A | * | 5/2000 | Coppersmith et al. | 380/54 |
| 6,144,848 A | * | 11/2000 | Walsh et al. | 455/419 |
| 6,463,534 B1 | * | 10/2002 | Geiger et al. | 713/168 |
| 6,672,505 B1 | * | 1/2004 | Steinmetz et al. | 235/379 |
| 6,910,020 B2 | * | 6/2005 | Oyama et al. | 705/38 |
| 7,031,946 B1 | * | 4/2006 | Tamai et al. | 705/67 |
| 7,062,069 B2 | * | 6/2006 | Rhoads | 382/100 |
| 7,065,503 B2 | * | 6/2006 | Matsushima et al. | 705/51 |
| 7,382,255 B2 | * | 6/2008 | Chung | 340/572.1 |
| 7,457,957 B2 | * | 11/2008 | Choi et al. | 713/176 |
| 2002/0069119 A1 | * | 6/2002 | Rogatinsky | 705/26 |
| 2004/0000585 A1 | * | 1/2004 | Silverbrook et al. | 235/383 |
| 2005/0110640 A1 | * | 5/2005 | Chung | 340/572.1 |

OTHER PUBLICATIONS www.procrit.com/counterfeit/archive/6_12_02.html, Archived Information Counterfeiting of Procrit (Epoetin alfa), downloaded Jan. 31, 2005.
www.procit.com/counterfeit/letter.html, Updated Information Counterfeiting of Procrit (Epoetin alfa), downloaded Jan. 31, 2005.
Dr. Andrew D. Dubner—"Securing the Pharmaceutical Supply Chain—The Authenticated RFID Platform"—3M White Paper—Jun. 2005—8 pages.

* cited by examiner

*Primary Examiner* — James D Nigh
(74) *Attorney, Agent, or Firm* — Mannava & Kang, P.C.

(57) ABSTRACT

Information from a package is read. An encryption key is generated from the information read from the package. A text unit is encrypted using the encryption key. The encrypted text unit is affixed to the package.

17 Claims, 7 Drawing Sheets

ENCRYPTING A TEXT UNIT FROM PACKAGE INFORMATION FOR PACKAGE AUTHENTICATION

BACKGROUND

Products sold to customers are often sent through a series of intermediate points between the original source, such as a manufacturer, and the customers, who may buy the products from a retailer. Products may include food items, pharmaceutical drugs or other products, including products of manufacture. These products may be sold to a customer through a grocery store, a pharmacy, a department store or other type of retailer.

Counterfeited products may enter the supply chain to the customer at any number of different points in the supply chain. For example, a wholesaler may receive counterfeit goods which it passes on to a retailer, or directly to the customer.

Because of the possibility of spoofing, wherein a counterfeiter copies the packaging of the product, manufacturers attempt to prevent entry of counterfeit products into the marketplace by protecting the packages. Manufacturers can make it difficult for counterfeiters to copy or spoof the packaging on their products. Some approaches that manufacturers have used include using holograms or three dimensional printing on packages. For example, a hologram of a company's logo is placed on a package so a customer buying the product knows that the product is from the company and is not counterfeit. These approaches provide some deterrence. However, counterfeiting has become very sophisticated so that it is has become difficult for manufacturers to provide product packaging that cannot be replicated by counterfeiters of the product.

SUMMARY

A package that may be authenticated is produced. Information from the package is read. An encryption key is generated from the information read from the package. A text unit is encrypted using the encryption key. The encrypted text unit is affixed to the package, which is used for authenticating the package.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Figure 1:
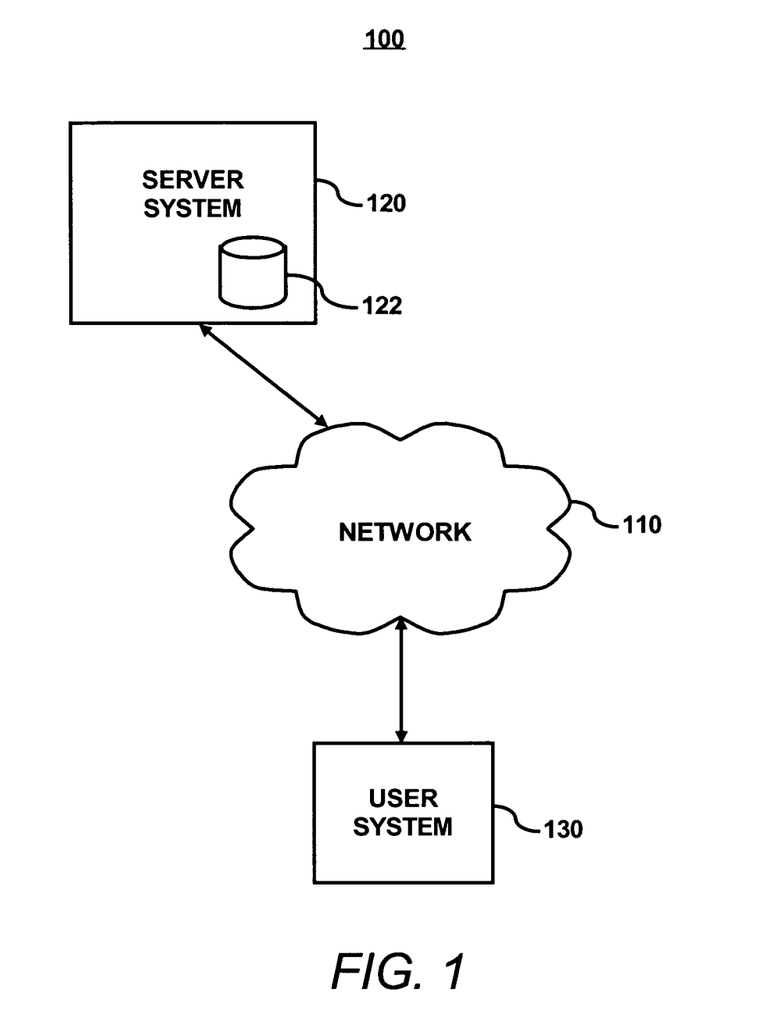
FIG. 1 illustrates an example of an authentication system.

FIG. 1 illustrates a simplified example of a system 100 through which packaging of a product may be authenticated. The system 100 may include a network 110, a server system 120 and a user system 130. The server system 120 and the user system 130 may include any type of computer system, such as the computer system described with reference to FIG. 6. The server system 120 may include a network interface including software and/or hardware, and serving software (not shown) for communicating with other systems connected to the server system 120 through the network 110. The server system 120 may also include a database 122 storing information with which the server system 120 may authenticate packages. The network 110 may include any type of network, including a LAN, a WAN, the Internet, etc.

In the system 100, a user system 130 may send package information regarding features of a package to be authenticated to a server system 120 via the network 110. The package information may be input into the user system 120 by using some type of a reader, manually typing information, or any other known procedure for manually or automatically inputting data into a computer system. A reader may include any type of a reader for reading information, including any type of scanner (such as a bar code scanner), a radio frequency identification ("RFID") tag reader, etc.

The user system 130 may submit the package information to the server system 120 through a website administered by the server system 120. The server system 120 compares the received information to information stored in a database 122. The server system 120 transmits a message indicating that the package is authentic or informing the user system 130 that the package may not be authentic via the network 110. The message transmitted by the server system 120 may include a message sent to the user's browser or an email or other type of message, including facsimiles. In other embodiments, the user system may submit the package information through a non web based user interface to the server system.

Figure 2:
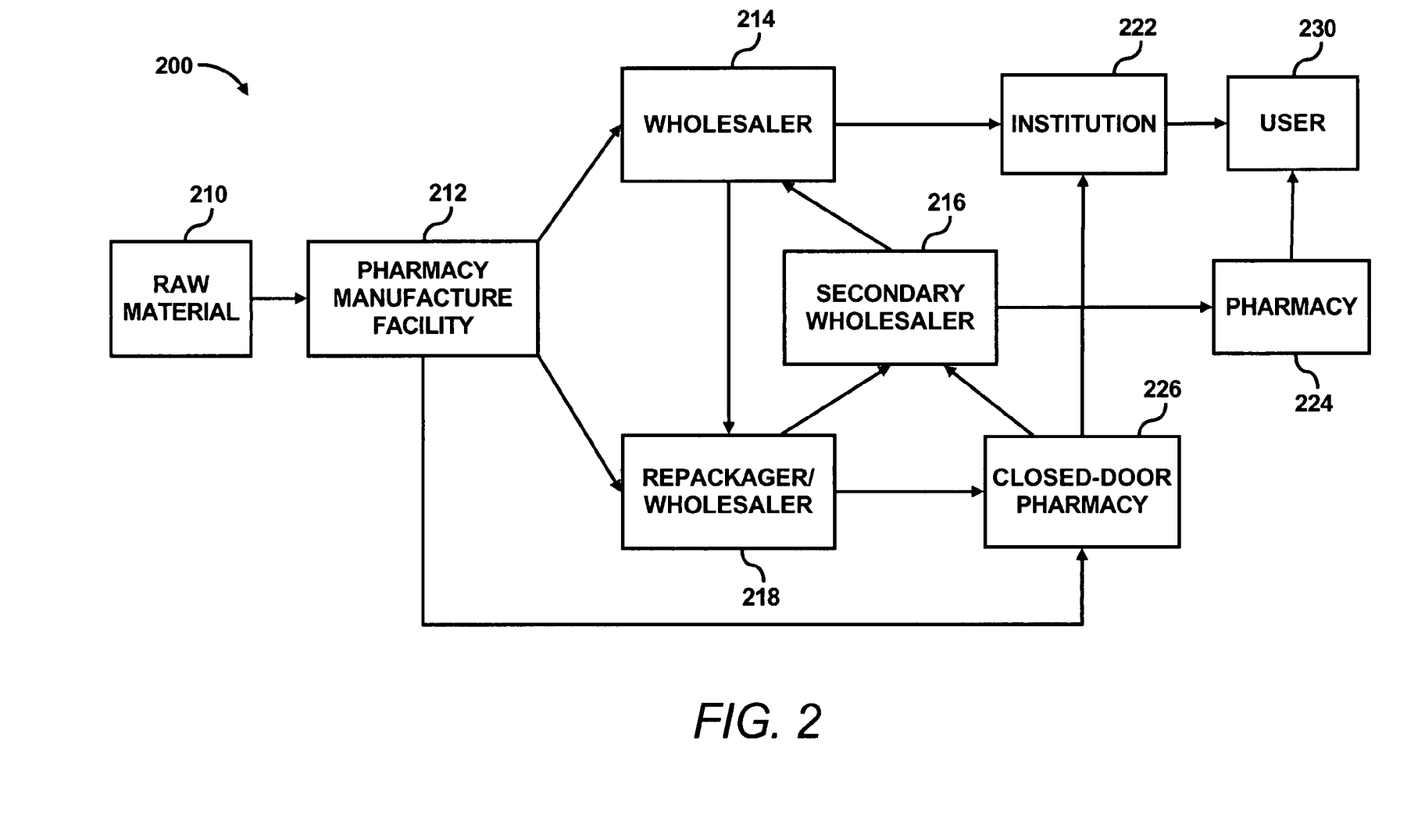
FIG. 2 illustrates an example of a supply chain in which an authentication system may be used.

The system 100 may be used to authenticate any type of product at any point of a supply chain, from the manufacturer to the customer. As an example, FIG. 2 illustrates a pharmaceutical supply chain and use of the authentication system in FIG. 1 in the pharmaceutical supply chain. It will be apparent that the authentication system can be used in supply chains for many product types.

FIG. 2 illustrates a simplified example of a supply chain 200 for the sale of pharmaceutical ("pharma") products. As shown in FIG. 2, raw materials 210 are received by a pharma manufacturing facility ("PMF") 212. The PMF 212 sends the manufactured pharma products to a wholesaler 214 or a repackager/wholesaler 218. The wholesaler 214 may sell the pharma products to institutions 222, such as hospitals, nursing homes or hospices, or pharmacies 224, which sell the pharma products to individual users 230. The wholesaler 214 may also send some of its received pharma products to the repackager/wholesaler 218.

The repackager/wholesaler 218 may sell the pharma products to closed-door pharmacies 226. The closed door pharmacies 226 sell the pharma products to institutions 222, such as hospitals, nursing homes or hospices. The PMF 212 may also directly provide pharma products to the closed-door pharmacies 226.

Problems with counterfeit goods may arise with a network of secondary wholesalers 216. Some of the pharma products received by the repackager/wholesalers 218 or closed-door pharmacies 226 may end up at the secondary wholesalers 216, who may sell the pharma products at highly discounted prices to pharmacies 224. The secondary wholesalers 216 may sell some of the pharma products to the wholesalers 214.

Due to the number of entities handling the pharma products as they progress through the supply chain, pharmacies 224 and institutions 222 may receive counterfeit pharma products. For example, secondary wholesalers 216 may receive counterfeit products, which the secondary wholesalers 217 may sell to pharmacies 224 or wholesalers 214, introducing the counterfeit products into the supply chain. Counterfeit pharma products may include pharma products that have been reimported into the country from abroad, pharma products that have expired (but the expiry dates have been changed on the packaging), or pharma products not manufactured by the PMF 212 that are packaged in packaging designed to spoof the packaging of actual pharma products.

The authentication system 100 in FIG. 1 may be used in the supply chain 200 to authenticate pharma products produced by the PMF 212. The server system 120 used to authenticate the pharma products may be administered by the PMF 212 or administered by an agent of the PMF 212. The user system 130 may be located at any of the other locations in the supply chain 200, including the institution 222, the pharmacies 224, closed-door pharmacies 226, the wholesaler(s) 214, repackager/wholesaler(s) 218, secondary wholesaler(s) 216, or individual user 230. Also, the user system 130 may be located at any point outside of the supply chain where authentication is desired.

Figure 3A:
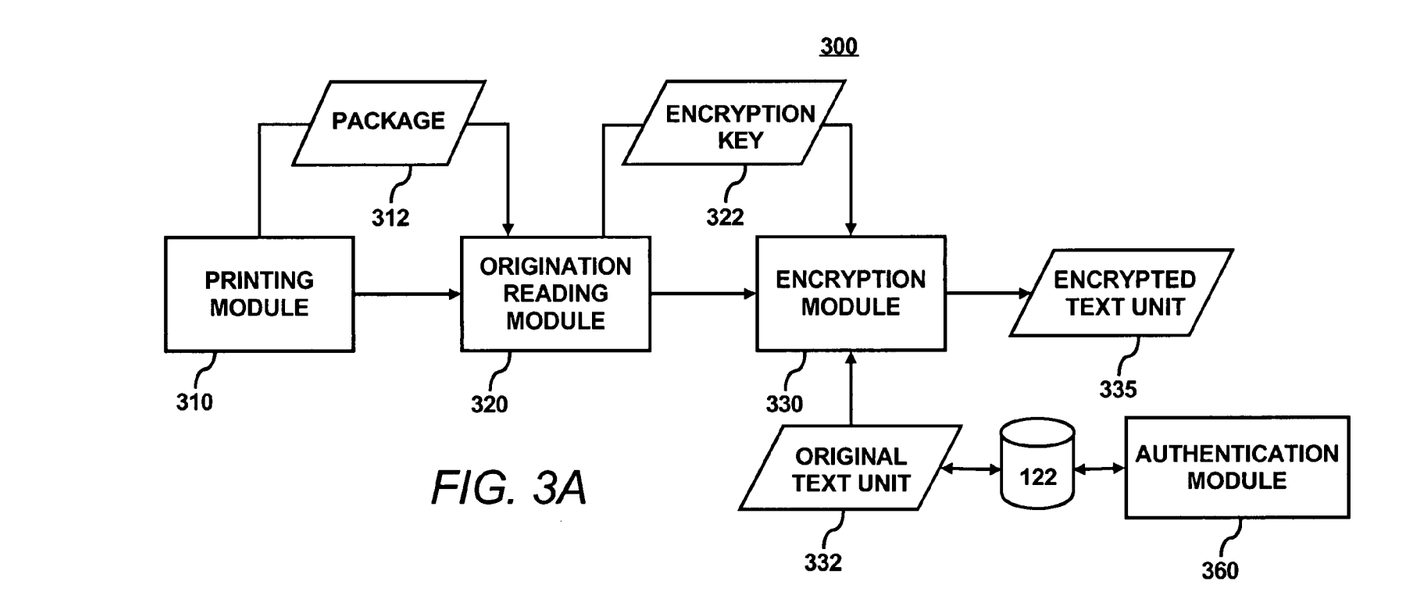
FIG. 3A illustrates data flow within an embodiment of a system for producing a package that may be authenticated.

FIG. 3A illustrates a simplified example of data flow in a system 300 for providing products that may be authenticated, including, but not limited to, pharma products. The product providing system 300 may include a printing module 310, an origination reading module 320, an encryption module 330 and an authentication module 360. The printing module 310, the origination reading module 320, and the encryption module 330 may be located at the PMF 212 shown in FIG. 2. The authentication module 360 may be located at the PMF 212 or at an agent of the PMF 212. The authentication module 360 may be part of the server system 120 shown in FIG. 1.

At the printing module 310, a package 312 is generated. The package 312 may be printed using custom printing or custom manufacturing methods. For example, packaging material for 100 boxes may be printed as one sheet, where features of the printed packaging material for each box may have minor differences from features of the printed packaging material for the other boxes. The minor differences may be used for authentication. Examples of minor differences may be differences in color, differences in font size, differences in location of printed features on the package, and the like. Alternatively, the information printed on each box used for authentication may be the same. For example, a logo may be read as bits and used to generate the encryption key. Alternatively, a portion of the printed features may be used to generate the encryption key, such as a portion of a logo, or all the printed information on one side of a box.

As described above, a package may include a container, a carton or a pallet, where a carton includes 20-30 containers and a pallet includes about 500 or more cartons. A container may include a box or a bottle or any other type of receptacle or container for goods. A container could be made of one or a combination of materials (such as plastic, metal, cardboard).

At the origination reading module 320, a reading device reads each package 312. The package 312 may be read using a scanner or other reading device. The reading of the package 312 produces a collection of bits, referred to as the read bits. For example, the package information in the package 312 may be stored and retrieved as bits, such as bits stored in a RFID tag on the package 312. Alternatively, the origination reading module 320 may convert the data into bits, such as reading a bar code or scanning in information from the package 312 and converting the read package information into the read bits. The read bits are used to generate an encryption key 322. The origination reading module 320 uses a predetermined algorithm to form the encryption key 322. For example, the predetermined algorithm may instruct the origination reading module 322 to use every $100^{th}$ bit or every $10^{th}$ bit of the read bits. In another example, the predetermined algorithm may instruct the origination reading module 322 to use the first 160 bits, the last 160 bits or the first 80 bits and the last 80 bits of the read bits.

Although the encryption key 322 is shown as being generated in the origination reading module 320, in other embodiments, the encryption key 322 may be generated in the encryption module 330. For example, the origination reading module 320 may forward all of the read bits to the encryption module 330. Then, the encryption module 330 uses the predetermined algorithm to determine which bits of the read bits to use as the encryption key 322.

At the encryption module 330, the product providing system 300 may encrypt a text unit 332 with the encryption key 322 to generate an encrypted text unit 335. The text unit 332 is referred to as "original text unit" 332 in FIG. 3A and FIG. 3C to distinguish it from the recovered text unit 352, shown in FIG. 3C. The term text unit may refer to any type of text unit, from a single letter or alphanumerical character to a phrase, sentence or paragraph. The term "original" refers to the text unit 332 as being the text unit that is encrypted at the origination of the package.

The original text unit 332 may include a predetermined text unit. In one example, the original text unit 332 may include a text unit that is assigned to a specific manufacturer for use with all of the packages for the manufacturer's products. In another example, the original text unit 332 may include a text unit that is specific to a product line of a manufacturer for use with all of the packages for the product line. The original text unit 332 may be stored in a database 122 of a server system 130, shown in FIG. 1, for comparison during an authentication process.

Figure 3B:
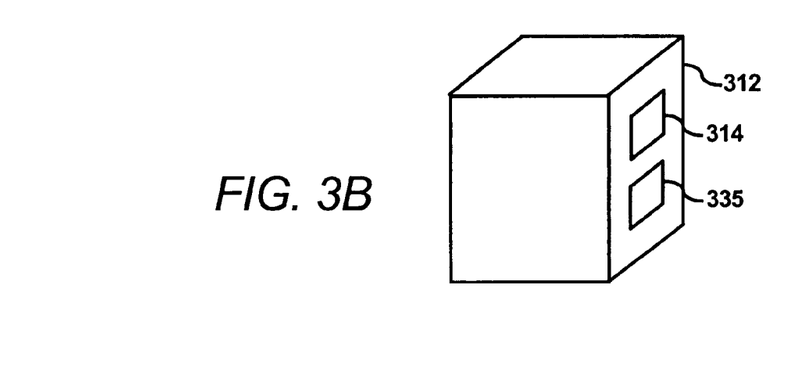
FIG. 3B illustrates a package produced by the system of FIG. 3A.

The encryption module 330 generates an encrypted text unit 335 by encrypting the original text unit 332 with the encryption key 322. The encrypted text unit 335 may be affixed to the package 312, as shown in FIG. 3B. The term "affixed" to the package, as used in this application, may refer to anything that is integral to the package in some way. For example, each feature may be printed on or embedded within the package. The features may also be permanently or semi-permanently attached to the package during manufacture or shortly thereafter using adhesive or mechanical methods.

The encrypted text unit 335 may be affixed using any method of affixing. For example, the encrypted text unit 335 may be affixed using a printing process, a label, a RFID tag or an embedded microprocessor, an electronic substrate or some other type of electronic active device with memory capabilities and internal power is used to store the encrypted information until it is further accessed for authentication at some other point of the supply chain.

For example, the package 312 shown in FIG. 3B includes an RFID tag 314. The RFID tag 314 may include one or more types of information for the package 312, such as a serial number. Although the affixed encrypted text unit 335 is shown outside of the RFID tag 314, in some embodiments, the RFID tag 314 may store the encrypted text unit 335.

The RFID tag 314 uses radio frequency technology to transmit information stored in the RFID tag 314. For example, the RFID tag 314 may include an integrated circuit and an antenna. The RFID tag 314 preferably includes a passive RFID tag (not using an internal power source such as a battery). However, an active RFID tag (using an internal power source, such as a battery) may be used. The RFID tag 314 may be read by a RFID reader (not shown). The RFID reader may generate a magnetic field for interrogating the tag 314 using an antenna, which may include an inductive element. The magnetic field induces an energizing signal for powering the RFID tag 314 via the antenna. When powered the RFID tag 314 generates a signal which may include information associated with the package 312. The signal is modulated using a know modulation scheme and transmitted to the RFID reader.

The RFID tag 314 may be read or written to from distances of up to 20 feet, and is not required to be in the line of sight of the RFID reader to be read. The RFID tag may be affixed onto the package 312 prior to, during, or after a process of printing information on the material used to form the package 312 or on material affixed to the package 312, such as a label. It will be apparent to one of ordinary skill in the art that instead of a RFID tag, any known technique may be used for storing the encrypted text unit 335 on the package 312, such as bar code, other types of printed mediums, tags other than radio frequency, and any storage medium that may be affixed to or may be included in the package 312.

FIG. 3A also discloses an authentication module 360. Operation of the authentication module 360 is discussed with reference to FIG. 3C. A system 302 is used to authenticate the package 312. The authentication system 302 includes a user reading module 340, a decryption module 350 and the authentication module 360. The user reading module 340 and the decryption module 350 may be part of the user system 130 shown in FIG. 1.

Figure 3C:
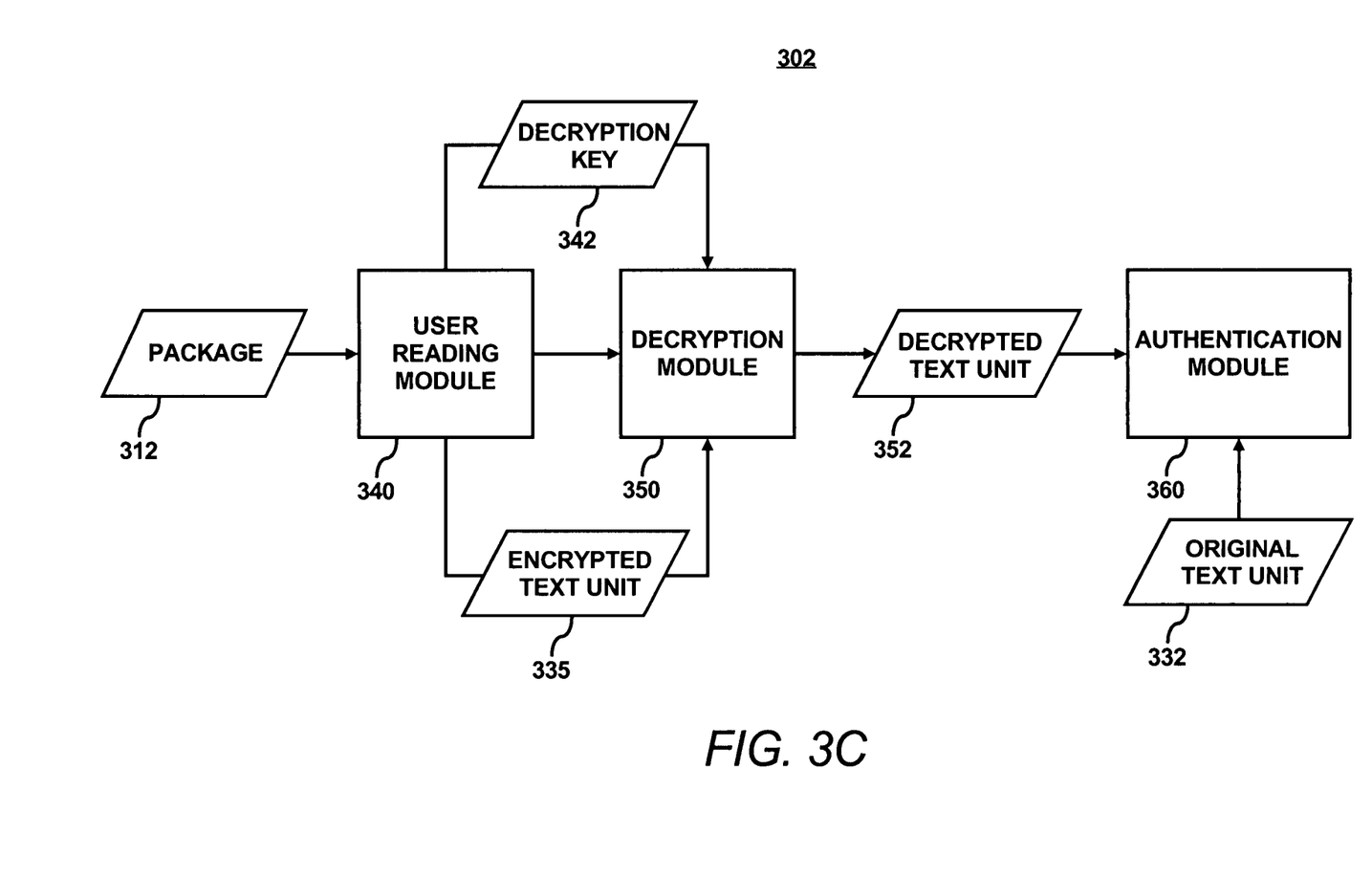
FIG. 3C data flow of an authentication system.

The user reading module 340 operates in a manner similar to the origination reading module 320. At the user reading module 340, a reading device reads each package 312. The package 312 may be read using a scanner or other reading device. The reading of the package 312 produces a collection of read bits. The read bits are used to generate a decryption key 342. The user reading module 340 uses the same predetermined algorithm as the origination reading module 320 to form the decryption key 342. Although the decryption key 342 is shown as being generated in the user reading module 340, in other embodiments, the decryption key 342 may be generated in the decryption module 350. For example, the user reading module 340 may forward all of the read bits to the decryption module 350. Then, the decryption module 350 would use the predetermined algorithm to determine which bits of the read bits to use as the decryption key 342.

The user reading module 340 also reads the encrypted text unit 335 from the package 32 using either the same reading device or another reading device, depending, for example, on how the encrypted text unit 335 is affixed to the package 312. In one example, if the encrypted text unit 335 is store in the RFID tag 314, the encrypted text unit 335 may be read using an RFID tag reader.

The decryption key 342 and the read encrypted text unit 335 are forwarded to the decryption module 350. The decryption module 350 decrypts the encrypted text unit 335 using the generated decryption key 342 to produce a decrypted text unit 352.

The system 302 presents the decrypted text 352 to the authentication module 360. The user system 130 may submit the decrypted text 352 to the authentication module 360 through a website. The website may be administered by the server system 120. In other embodiments, the user system may submit the decrypted text through a non web based user interface accessing the authentication module.

The authentication module 360 compares the decrypted text unit 352 to the original text unit 332 to determine whether the package 312 is authentic. The authentication module 360 transmits a message to the user system 130 indicating whether the package is authentic or not authentic.

Figure 4:
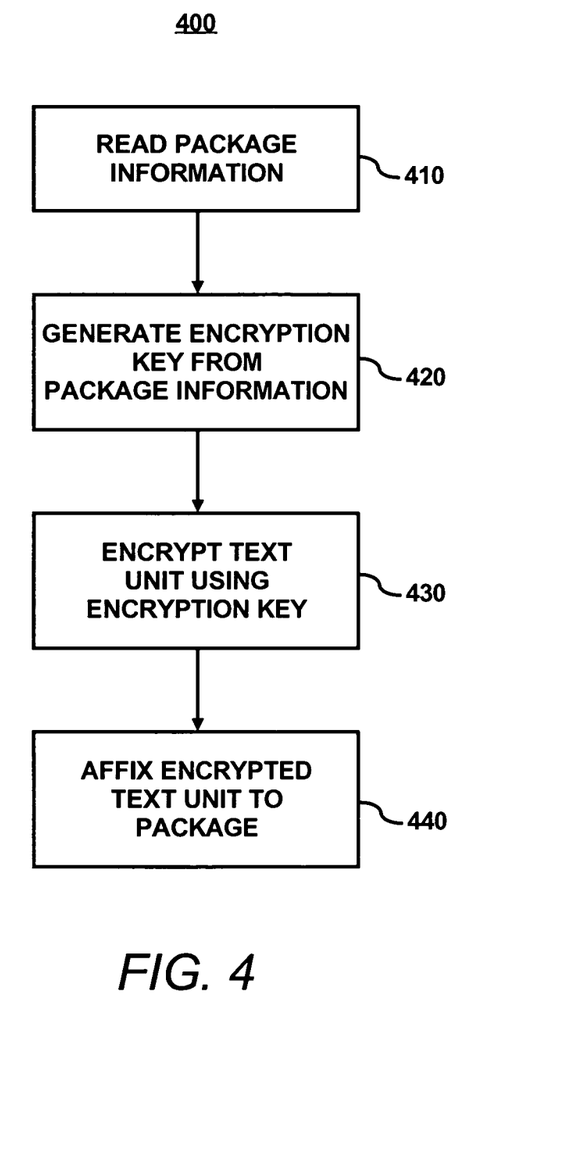
FIG. 4 illustrates an example of a method of producing a package that may be authenticated.

FIG. 4 is a flow diagram illustrating an embodiment of a method of producing a package 312, as shown in FIGS. 3A, 3B, and 3C, which may be authenticated. At step 410, the origination reading module 320 reads information from the package 312 as a collection of bits. At step 420, either the origination reading module 320 or the encryption module 330 generates an encryption key 322 from the read bits.

At step 430, the encryption module 330 encrypts the original text unit 332 using the encryption key 322 to generate the encrypted text unit 335. At step 440, the encrypted text unit 335 is affixed to the package 312. Affixing the encrypted text unit to the package may include printing the encrypted text unit on the package, placing a label on the package including the encrypted text unit, storing the encrypted text unit in a RFID tag or storing the encrypted text unit in an embedded microprocessor.

The package producing method 400 may also include printing the package 312. Printing the package may include printing features on the package using custom printing or custom packaging methods. The features may be printed using variable data printing, where printing is varied per package. The features may include any feature that may be printed or placed on the package. Variations in the features may include one or more of a number placed somewhere on the package, variation in appearance of various features of the package, watermarks placed on the package, and placing various patterns or images on the package, colors, and information stored in a RFID tag.

Variations in appearance may include variations in color coding, resolution, line thickness, spacing, curvature, length, scale, and so on. The variations in appearance may be applied to an ingredients list or other words on the package such as using variable colored characters or different font sizes in text. Variations may be applied to a test target, such as a standard Macbeth color target, by printing a uniform hue rectangular target using differences in hue. Variations in test targets may also include variations in modulation transfer function ("MTF") patterns by printing MTF pattern sets with different low-resolution and high-resolution targets. Line thickness, spacing, percentage of colors in test targets may also be varied. The varied features per package may include the information read for determining the encryption key 332 described at step 420. For example, the read bits may be determined from a varied feature on the package 312. The read bits may include a digital representation of the read feature, such as a scanned image.

Figure 5:
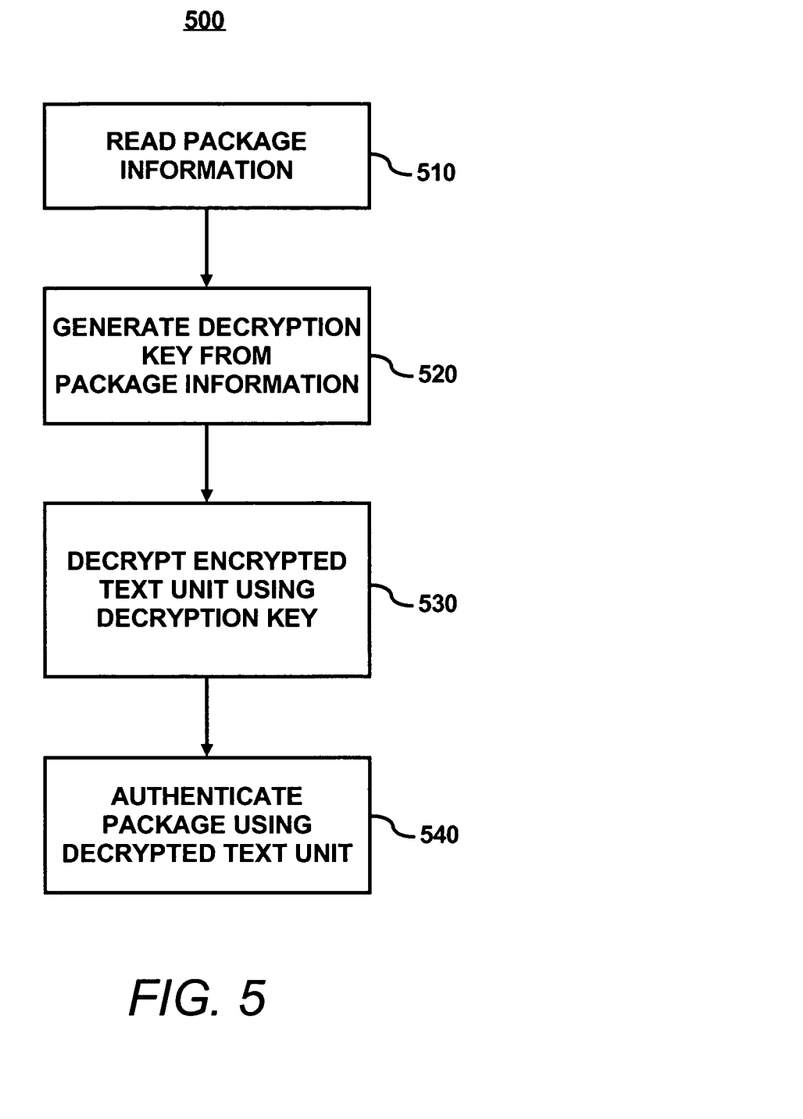
FIG. 5 illustrates an example of a method of authenticating a package.

FIG. 5 is a flow diagram illustrating a method 500 of authenticating the package 312, as shown in FIGS. 3A, 3B, and 3C. At step 510, the user reading module 340 reads information from the package 312. This may include reading a collection of bits from the package 312 or generating a collection of bits from the read information. Reading the package may also include reading the encrypted text unit 332 from the package 312. At step 520, either the user reading module 340 or the decryption module 350 determines the decryption key 352 from the read bits using the predetermined algorithm.

At step 530, the decryption module decrypts the encrypted text 335 unit using the generated decryption key 342 to generate the decrypted text unit 352. At step 540, the authentication module 360 authenticates the package using the decrypted text unit 352. Authenticating the package 312 may include comparing the decrypted text unit 352 to the stored original text unit 332. The authentication may be done in the user system 130, shown in FIG. 1, or the server system 120. For example, the user system 130 may store a copy of the original text unit 332. Thus, the authentication module 360 may be part of the user system 130.

In another example, the server system 120, as shown in FIG. 1, may receive the decrypted text unit from the user 230 shown in FIG. 2. The user 230 may transmit the decrypted text unit from the user system 130 to the authentication module 340. In this example, the authentication module 340 may be part of the server system 120. The server system 120 may administer an authentication website through which the user 230 may submit the description to the server system 120. In other embodiments, the user system may submit the decrypted text through a non-web based user interface accessing the authentication module.

The authentication method 500 may also include the server system 120 transmitting authentication information to the user system 130 based on a comparison of the decrypted text unit 352 to the stored original text unit 332. For example, if the received decrypted text unit 352 matches a stored original text unit 332, the server system 120 may transmit a message to the user system 130 indicating that the received decrypted text unit 352 represents an authentic package. If the received decrypted text unit 352 does not match a stored original text unit 332, the server system 120 may transmit a message to the user system 130 indicating that the decrypted text unit 352 does not represent an authentic package. The message may include a facsimile, an email or a message displayed on a web page viewable in a web browser of the user system 130, where the web page is part of a website administered by the server system 120. In other embodiments, the message may be displayed on a non-web based user interface.

Figure 6:
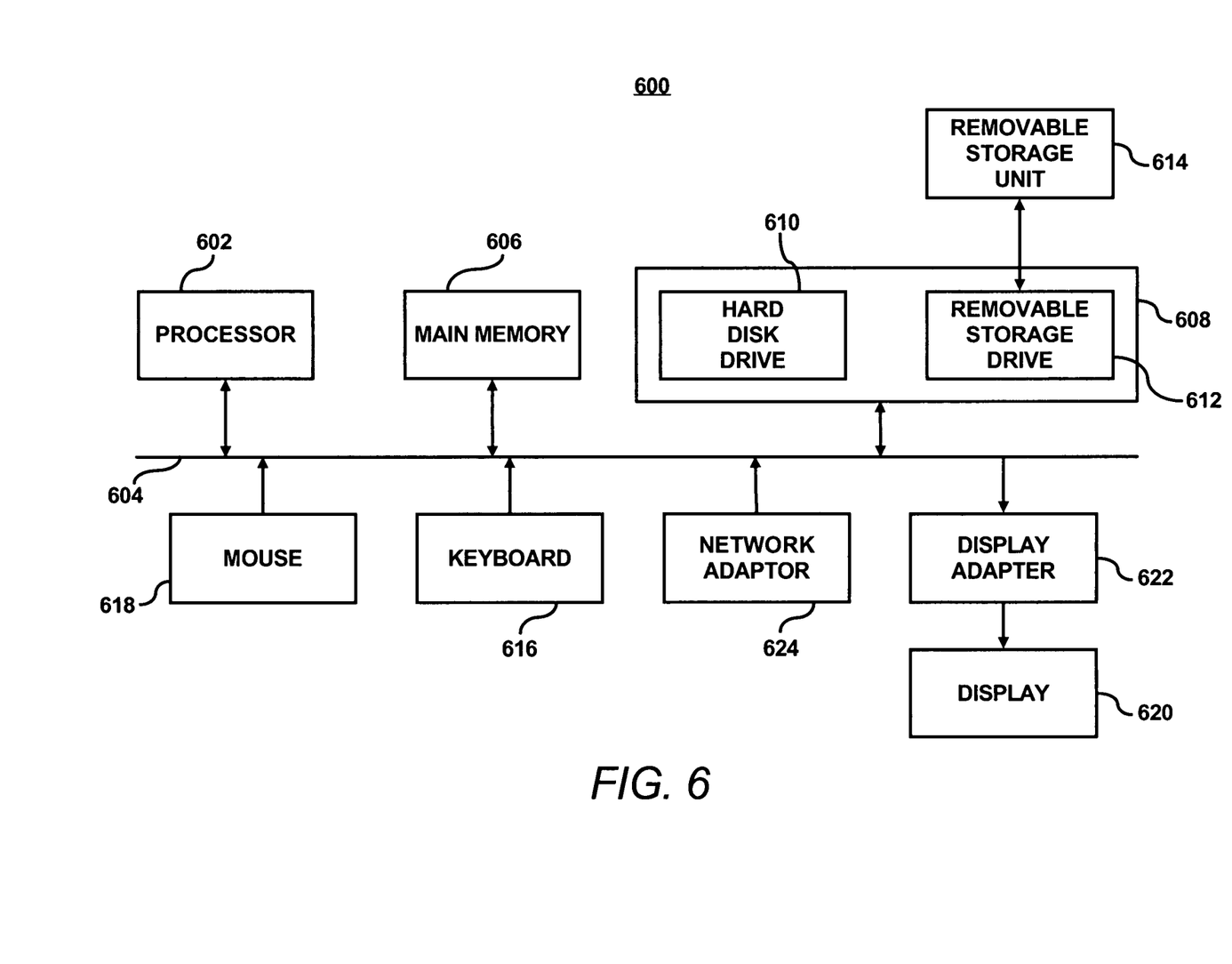
FIG. 6 is a block diagram illustrating a computer system operable to perform the method depicted in FIGS. 4 and 5.

FIG. 6 illustrates an embodiment of a computer system 600 operable to control the package authentication process described with respect to the methods 400 and 500. In this respect, the computer system 600 may be used as a platform for executing one or more of the functions described hereinabove with respect to the various steps outlined in the methods 400 and 500.

The computer system 600 includes one or more controllers, such as a processor 602. The processor 602 may be used to execute some or all of the steps described in the methods 400 and 500. Commands and data from the processor 602 are communicated over a communication bus 604. The computer system 600 also includes a main memory 606, such as a random access memory (RAM), where program code resides during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for the methods 400 and 500 may be stored.

The removable storage drive 612 reads from and/or writes to a removable storage unit 614 in a well-known manner. User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor 602 may communicate over a network, for instance, the Internet, LAN, etc., through a network adaptor 624.

It will be apparent to one of ordinary skill in the art that other known electronic components may be added or substituted in the computer system 600. In addition, the computer system 600 may include a system board or blade used in a rack in a data center, a conventional "white box" server or computing device, etc. Also, one or more of the components in FIG. 6 may be optional (for instance, user input devices, secondary memory, etc.).

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method of producing a package that may be authenticated, the method comprising:
   printing packaging material, including at least one feature, for a package using variable data printing wherein the at least one feature of the packaging material is varied per package;
   reading the at least one feature of the packaging material from the package;
   generating, by a processor, an encryption key from the at least one feature read from the package;
   encrypting a text unit using the encryption key; and
   affixing the encrypted text unit to the package.

2. The method of claim 1, wherein the at least one feature comprises one or more of a number on the package, a watermark, a pattern, an image, and appearance of a feature of the package.

3. The method of claim 2, wherein the appearance of a feature printed on the package comprises at least one of color coding, resolution, line thickness, spacing, curvature, length, and scale.

4. The method of claim 1, wherein affixing the encrypted text unit to the package comprises at least one of printing the encrypted text unit on the package, placing a label on the package including the encrypted text unit, storing the encrypted text unit in a radio frequency identification ("RFID") tag or storing the encrypted text unit in an embedded microprocessor, an electronic substrate or an electronic active device with memory capabilities and internal power.

5. The method of claim 1, further comprising generating the encryption key based on a predetermined algorithm.

6. A method of authenticating a package, the method including:
   reading at least one feature from a package, wherein the at least one feature is printed using variable data printing and is varied per package;
   generating, by a processor, a decryption key from the at least one feature read from the package;
   decrypting an encrypted text unit associated with the package using the decryption key to produce a decrypted text unit; and
   authenticating the package using the decrypted text unit.

7. The method of claim 6, further comprising reading the encrypted text unit from the package.

8. The method of claim 7, wherein reading the encrypted text unit from the package comprises reading the encrypted text unit from at least one of a printed material, a label, an RFID tag, an embedded microprocessor, an electronic substrate or an electronic active device with memory capabilities and internal power.

9. The method of claim 6, wherein authenticating the package comprises comparing the decrypted text unit to a stored original text unit.

10. The method of claim 6, wherein authenticating the package comprises receiving an authentication message indicating whether the package is an authentic package or not an authentic package.

11. The method of claim 10, wherein receiving the authentication message comprises receiving a message indicating that the package is authentic if the decrypted text unit matches the stored original text unit.

12. The method of claim 10, wherein receiving the authentication message comprises receiving a message indicating that the package may not be authentic if the decrypted text unit does not match the stored original text unit.

13. The method of claim 6, wherein generating the decryption key comprises generating the decryption key based on a predetermined algorithm.

14. A system for generating an encryption key based on information from a package, the system comprising:

a computer readable medium storing at least one computer program that when executed performs instructions of different modules;

an origination reading module stored in the computer readable medium, wherein the origination reading module is configured to read at least one feature from a package as bits, wherein the at least one feature is printed using variable data printing and is varied per package, and wherein the origination reading module is further configured to generate an encryption key from the read bits based on a predetermined algorithm; and an encryption module stored in the computer readable medium, wherein the encryption module is configured to generate an encrypted text unit by encrypting an original text unit with the encryption key.

15. The system of claim 14, further comprising:

a printing module stored in the computer readable medium, wherein the printing module is configured to print features on a package wherein the features vary per package.

16. The system of claim 15, wherein the read at least one feature comprises the features printed on the package.

17. The system of claim 14, wherein the encryption module is further configured to affix the encrypted text unit to the package.

* * * * *